No. 876,295. PATENTED JAN. 7, 1908.
T. CARNEY.
CASH REGISTER.
APPLICATION FILED JUNE 15, 1900.

Witnesses
Inventor
Thomas Carney
By Alvan Macauley
Attorney

No. 876,295. PATENTED JAN. 7, 1908.
T. CARNEY.
CASH REGISTER.
APPLICATION FILED JUNE 15, 1900.

No. 876,295. PATENTED JAN. 7, 1908.
T. CARNEY.
CASH REGISTER.
APPLICATION FILED JUNE 15, 1900.

Witnesses
WM McCarthy
William H. Huzzy

Inventor
Thomas Carney
By Alvan Macauley
Attorney

No. 876,295. PATENTED JAN. 7, 1908.
T. CARNEY.
CASH REGISTER.
APPLICATION FILED JUNE 15, 1900.

UNITED STATES PATENT OFFICE.

THOMAS CARNEY, OF DAYTON, OHIO, ASSIGNOR, BY MESNE ASSIGNMENTS, TO THE NATIONAL CASH REGISTER COMPANY, OF DAYTON, OHIO, A CORPORATION OF OHIO, (INCORPORATED IN 1906).

CASH-REGISTER.

No. 876,295.  Specification of Letters Patent.  Patented Jan. 7, 1908.

Application filed June 15, 1900. Serial No. 20,383.

*To all whom it may concern:*

Be it known that I, THOMAS CARNEY, a citizen of the United States, residing at Dayton, in the county of Montgomery and State of Ohio, have invented certain new and useful Improvements in Cash-Registers, of which I declare the following to be a full, clear and exact description.

This invention relates to improvements in cash registering machines.

In the appended drawings forming part of this specification, Fig. 3 represents a vertical, transverse section through the machine taken on the line $y$—$y$ of Fig. 5 and looking in the opposite direction from that illustrated in Figs. 1 and 2.

In general terms this machine may be described as being a key-operated machine in which the keys are arranged in banks or groups, and coöperate with movable registering frames each of which is common to all of the keys of its particular group. These frames are arranged to be moved variable distances according to the value of the key operated and thus impart similar movements to a counter which is adapted to be moved into and out of mesh with segmental racks carried by said frames. The aforesaid keys are also arranged to elevate suitable indicators for indicating the amounts registered on the counter.

Described in detail, and as shown in the aforesaid drawings, 1 represents the frame of the machine; 2 the amount keys; 3 the special transaction keys and 4 the indicators.

Figure 5:
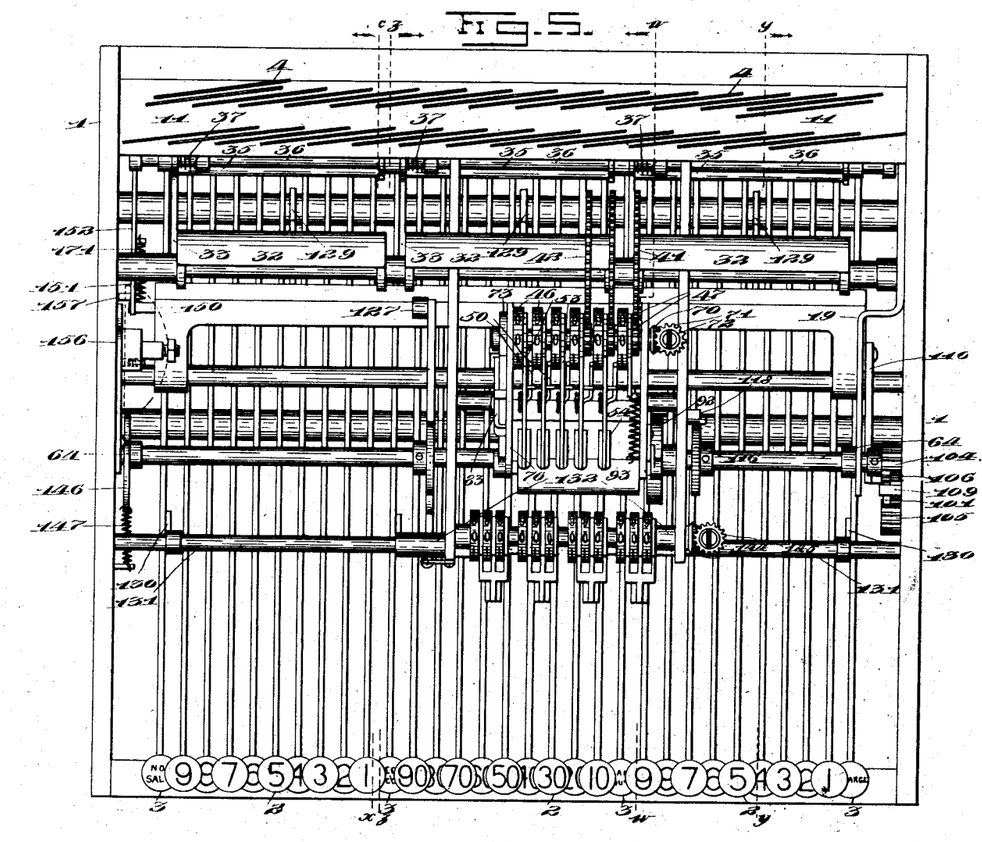
Fig. 5 represents a top plan view of my improved machine with the cabinet removed.

The amount keys 2 as shown in Fig. 5 are arranged in three banks or groups of nine keys each, which are numbered respectively from one to nine, ten to ninety and one to nine. These keys as shown in Fig. 1 are journaled upon a transverse shaft 6 and are provided near their rear ends with vertical operating plates 7 having coupling slots 8, and registering slots 9 formed therein, and hereinafter more fully described.

The indicators 4 are of the tablet or flag variety and each comprises a tablet containing the numeral and a supporting and operating shank 10 preferably formed integral therewith. These shanks are mounted in apertured guiding plates 11 and 12 suitably secured on the main frame and are formed respectively with supporting lips 13 which normally rest upon said plate 12 as clearly shown in Fig. 1 (see also Fig. 7).

It will be seen by reference to Fig. 5 that the indicators are arranged in two parallel rows and that the indicators of each row are turned slightly out of alinement with each other so as to lap one over the other as shown. This construction permits of a larger size indicator being employed than would be possible if the indicators were in alinement and extending edge to edge. The lower ends of the aforesaid shanks 10 terminate above the rear ends of the keys 2 whereby when the latter are operated their respective indicators will be elevated into exposed positions.

Figure 1:
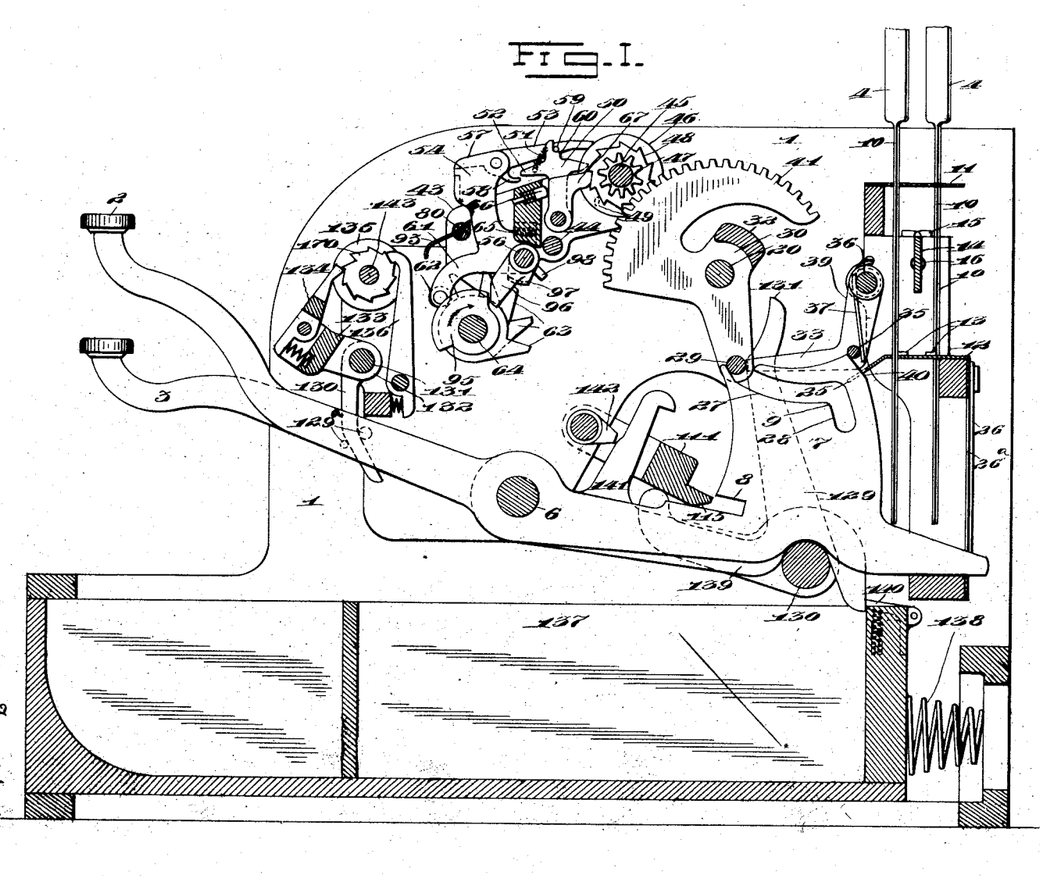
Figure 1 represents a vertical, transverse section through the devices embodying my invention taken on the line $w$—$w$ of Fig. 5 hereinafter described; the case being removed.
Figure 7:
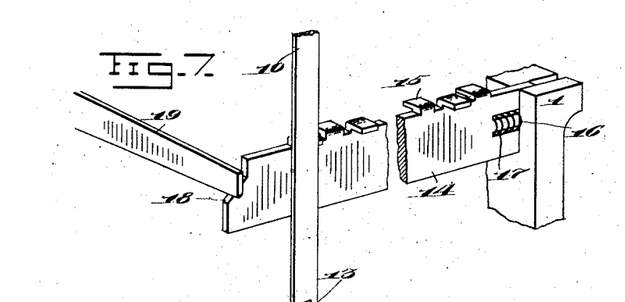
Fig. 7 represents an enlarged detail, perspective view, partly broken away, of the indicator supporting and locking bar and coöperating parts.

In order to hold the operated indicators in their exposed positions when the keys return to normal position I provide a supporting slide 14 which is mounted in the main frame so as to extend between the two rows of shanks 10 and is formed at its upper edge with spaced horizontal supporting lugs 15 every alternate one of which extends forward; the remainder extend rearward (see Figs. 1 and 7). When the supporting slide 14 is in its normal position the lugs 15 extend into the paths of the lips 13 of the two rows of indicators and thus support any indicators that have been elevated, in their exposed positions. The said slide is held in its normal position by a coiled spring 16, which is mounted in parallel slots 17 formed in one end of said slide, and bears against a portion of the main frame and the end walls of said slots as better shown in Fig. 7. The opposite end of said slide from that containing the slots 17 is beveled as at 18; said beveled wall being engaged by the shifting lever 19 journaled centrally upon a transverse shaft 20 (see Fig. 3). The rear end of the lever is normally held elevated against a stop pin 21 and out of contact with the wall 18 by a coiled spring 22 which connects it to the main frame. The forward downwardly-turned end of said lever 19 engages a cam 23 fast to a rotation shaft 64 which is actuated upon each operation of the keys as hereinafter described. The formation of the cam 23 is such that the lever 19 will be operated to engage the beveled wall 18 and move the slide 14 upon the initial movement of a key so that the lugs 15 will be shifted transversely, and out of alinement with the lips 13. The indicators that have been previously set will now drop and the new indicators will be permitted to rise as the lips 13 are free to pass between the lugs 15, because the supporting slide is for a time held in its shifted position. As the key approaches the end of its down stroke the lever 19 is allowed to return to normal position which action also permits the slide 14 to return to normal position and thus support the operated indicators in exposed positions and prevent the unoperated indicators from being raised.

Figures 10, 11:
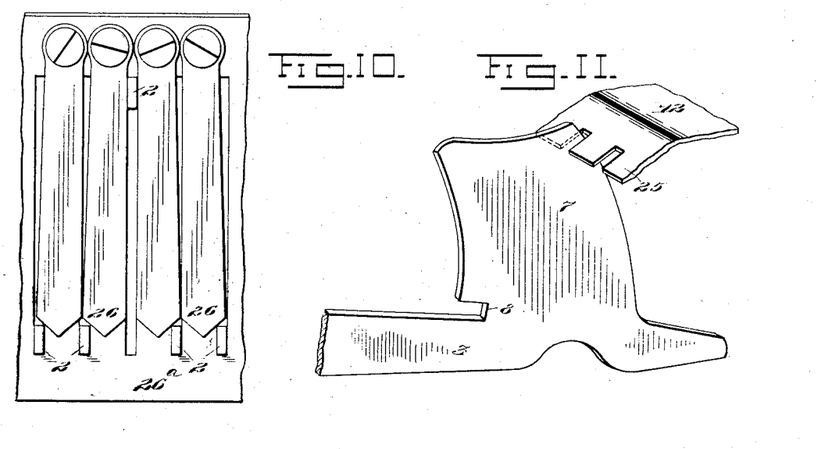
Fig. 10 represents a detail, rear elevation of a portion of the back of the machine; one of the keys being shown in its elevated position.
Fig. 11 represents a detail, perspective view of the fingered guide-plate and one of the special transaction keys coöperating therewith.

Each of the special keys 3 for "paid out", "charge", "received on account" and "no sale" transactions is similar to the amount keys except that the slots 9 in the plates 7 are omitted, as shown in Fig. 11. The rear ends of these special keys coöperate with special transaction indicators in substantially the same manner as the amount keys and their indicators.

As it is necessary in machines of the class to which the present invention belongs to prevent the operation of more than one key in the same bank during a single operation of the machine, I provide a series of pendent key-stops or hangers 26 (see Fig. 10) having beveled lower ends and so mounted above the rearwardly projecting ends of the keys that only one of the latter may be forced up between them at a time, which structure is well known in the art and needs no further explanation here.

Figure 2:
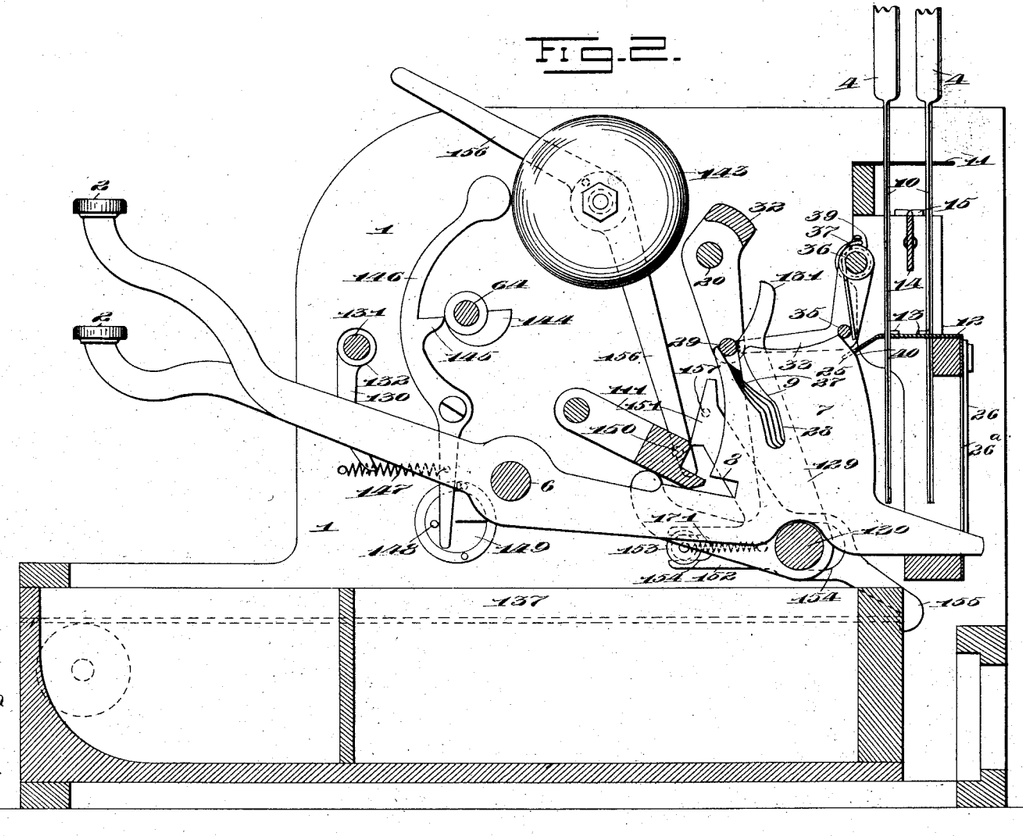
Fig. 2 represents a view similar to Fig. 1 but taken on the line $x$—$x$ of Fig. 5.

The above description covers the arrangement and operations of the keys and their indicators so that I shall now pass on to a description of the registering devices. Each of the amount keys as before stated, has, preferably formed integral therewith, an operating plate 7 which is provided with a registering slot 9. The keys are guided in their movements by spaced fingers 25 formed on the horizontally extending guide-plate 12 and by the vertical guide-plate 26ª, which is mounted on the rear side of the frame and is slotted so as to receive and guide the rearwardly projecting ends of the keys. Each of the registering slots 9 (Fig. 3) comprises two portions, namely, an inclined cam portion 27 and a free play portion 28, which latter is concentric to the shaft 6 upon which the keys are journaled. The mouths of all the registering slots are arranged in a straight line extending transversely of the machine and immediately below the rods 29 of the registering segments. As before stated, there are three sets or series of amount or value keys, each set comprising nine keys as is generally found in machines of this class. With respect to the formation and operation of the registering slots and the coöperation therewith of the registering frames, each set or series of amount keys is a duplicate of the other sets or series, so that a description of one set will suffice. In Fig. 3, for example, are shown several of the registering slots of the units of cents bank of keys. The cam portions 27 of the registering slots are of varying and graduated inclinations. They vary from the nearly straight and almost vertical inclination of the "1" key, as shown in Fig. 2, to the almost horizontal slot of the "9" key, as shown in Fig. 1.

The keys of each series of the amount or value keys, coöperate with one of the three registering frames 30 (Fig. 12) two of which are journaled loosely upon the transverse shaft 20, while the third is secured rigidly to it. Each registering frame comprises a registering segment, to be hereinafter referred to and two substantially vertical side arms 31 which are connected at their upper ends by the tie-bar 32 and at their lower ends by the operating rod or shaft 29 already referred to.

Figures 12, 13, 14:
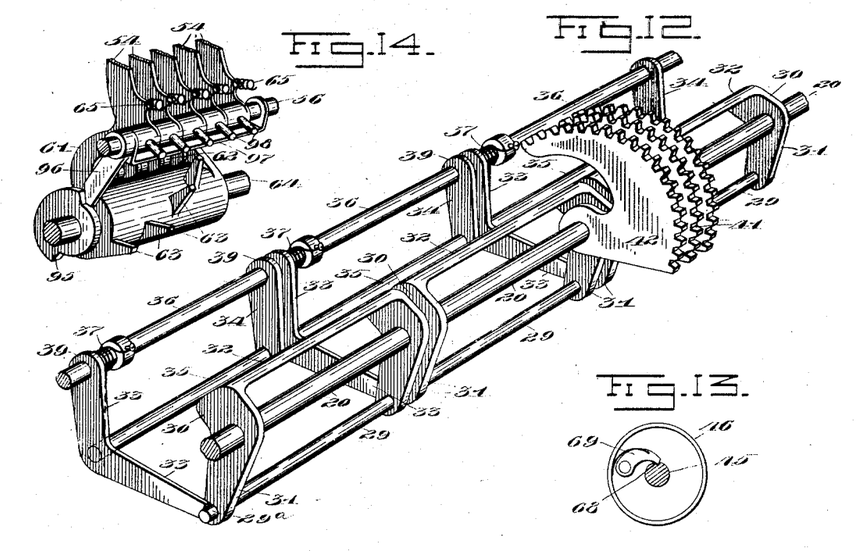
Fig. 12 represents a detail, perspective view of the registering frames and the pivoted latch-frames coöperating therewith.
Fig. 13 represents a detail, side elevation of one of the totalizing counter-wheels showing its connection with its shaft.
Fig. 14 represents a detail, perspective view, partly broken away, of the transfer levers, the pivoted yoke for moving the same and the transfer cam-arms for operating said levers.

It will be readily understood that when a key is operated, the bar 29 of its respective registering frame will enter the registering slot 9 and the cam portion 27 thereof will rock the frame to a degree corresponding to the value of the key. When the bar 29 enters the concentric portion 28 of the registering slot, the movement of the registering frame ceases and the latter together with the registering segment which it carries and actuates remain locked against movement in either direction until the operated key has partly completed its return movement.

It will be seen by reference to Fig. 3 that the normal position of the frames 30 is such that the bars 29 lie partly out of the mouths of the slots 9 and against the forward walls of the same. To positively return the bars to this normal position after the frames have been operated I provide a series of bell-crank levers 129, one for each frame and pivoted upon a transverse shaft 130 (see Fig. 1). One arm of each of said levers rests under the key coupler 111 hereinafter described while the other is formed with a cam extension 131 which coöperates with its respective bar 29. Upon the return of the keys and the consequent return movement of the key coupler, all of said levers 129 are struck by said key coupler and thereby their cam extensions engage the rods 29 and force the registering frames and segments to normal position.

Each of the rods 29 projects slightly beyond one end of its frame as at 29$^a$ so as to coöperate with one of a series of locking arms 33 as shown in Figs. 1 and 12. As these arms are similar in the several banks I will describe one only as such description will suffice for all. Each of said arms is of bell crank formation and together with an arm 34 and a connecting bar 35 forms a locking frame which is journaled upon a transverse shaft 36. A coiled spring 37 surrounds this shaft and is connected thereto at one end so that its free end will bear against the bar 35 to normally hold the locking frame 39 forward with the arm 33 in the path of the projecting end 29$^a$ of the rod 29 which effectually locks the registering frame 30 against any rocking movement.

When a key is operated its respective locking frame is rocked against the tension of its spring, to move the arm 33 out of the path of the projecting end 29$^a$, by the inclined rear edge 40 of the plate 7 of said operated key, which engages and forces the rod 35 rearward. When the key returns to normal position the frame 39 again swings forward under the impulse of its spring and the respective frame 30 again becomes locked by the arm 33.

Each of the registering frames 30 is provided with a segmental rack 41, those of the two right hand frames being formed on their adjoining ends while the rack 42 for the left hand frame is mounted fast upon the shaft 20 to which said frame is also connected (see Figs. 5 and 12). As the respective frames 30 are moved distances corresponding to the values of the operated keys their racks are also similarly moved and when meshing with the counter-pinions impart said movements to the counter-wheels.

Figure 6:
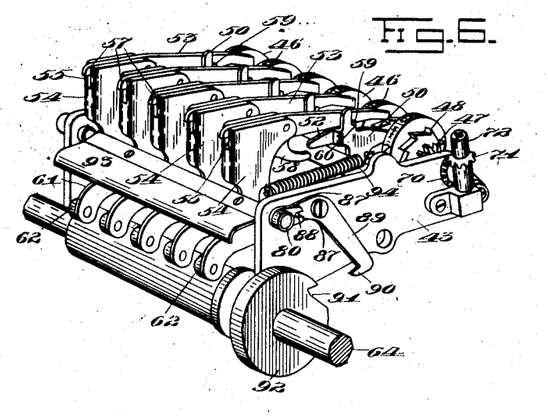
Fig. 6 represents an enlarged detail, perspective view of the counter detached from the machine.
Figure 17:
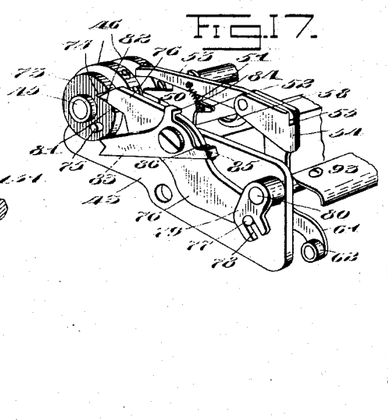
Fig. 17 represents an enlarged detail, perspective view of the end of the counter opposite from that shown in Fig. 6.

The counter as shown in Figs. 1, 6 and 17 comprises a frame 43 which is pivotally mounted on a shaft 44 which is in turn mounted in the main frame. Said frame 43 forms a support for a transverse shaft 45 upon which the counter-wheels 46 are journaled. Each of the first three counter-wheels which are arranged to be operated directly from the racks 41 and 42 is provided with a pinion 47; said pinions being arranged to mesh with the racks only when the counter-frame is thrown forward.

Each of the counter-wheels is provided with a ratchet-wheel 48 and a transfer stud 49 (Fig. 1). After a counter-wheel has made a complete revolution, which is the equivalent of one unit of the next higher wheel, its transfer stud engages the beveled end of one of a series of pivoted supporting pawls 50 and forces the same back against the tension of a coiled spring 51 which connects a rearwardly extending arm 52 formed on the same to one of a series of transfer pawls 53. Each of these pawls is pivoted in a groove 55 formed in one of a series of pivoted levers 54 which latter are pivotally mounted in the counter frame upon a transverse shaft 56 (Figs. 1 and 14). Each of the transfer pawls 53 is formed with a nose 57, a hook 58 and a trip pin 59. When the trip pawls 50 are in their normal positions the trip pins 59 rest upon shoulders 60 formed on said trip pawls and thus hold the transfer pawls 53 so elevated that they will not engage the ratchet wheels 48 when the levers 54 are moved forward as hereinafter described. When a pawl 50 is tripped or forced forward by a transfer stud 49 as above described the shoulder 60 will pass from under the pin 59 so that the transfer pawl 53 of the same will drop to such a position that it will engage its ratchet-wheel and actuate it when its lever 54 is operated. The pawls 53 when released are drawn downward by the coiled springs 51 but if they should move downward too slow or by any means become stuck in their elevated positions they are positively forced downward by the arms 52 engaging the hooks 58 upon the tripping of the pawls 50.

When a lever 54 is operated after its respective pawl 53 has been tripped the pawl engages its ratchet-wheel 48 and as it moves forward the front end of said pawl is, of course, elevated until the shoulder 60 again snaps under the pin 59; the pawl 50 being drawn forward by its spring 51 after it is relieved of the pressure of the transfer stud on the counter-wheel. As the transfer pawl 53 completes its final movement toward the counter the nose 57 becomes seated in the bottom of the groove 55 in which the pawl is pivoted and thus prevents any further elevation of the rear end of the pawl such as might otherwise be caused by a violent operation of the machine. The relative arrangement of the parts, is, of course, such that a pawl 50 is tripped by the movement of one counter-wheel while the transfer pawl 53 which it releases coöperates with the ratchet-wheel of the next higher counter-wheel.

As it sometimes occurs that a transfer will be caused by or follow a transfer during a single operation of the machine it becomes necessary to operate the transfer pawls 53 successively so that the transfer operations will follow each other in succession across the entire counter from right to left. These successive movements of the pawls are effected by the successive movements of the operating levers 54 each of which is provided with an operating arm 61 carrying an anti-friction roller 62 at its lower end. These rollers are arranged to be struck and forced forward successively by a series of cam arms 63 fast to a rotation shaft 64 hereinafter described (see Figs. 11 and 14).

The levers 54 are returned to their normal positions after being operated by coiled springs 65 mounted in sockets formed in the counter-frame and engaging the rear edges of said levers. The counter-frame further carries a series of spring pressed plungers 66 which engage a series of retaining pawls 67 also pivoted in the frame to force the same forward into engagement with the counter ratchet-wheels 48 to prevent any retrograde movement thereof.

Figure 4:
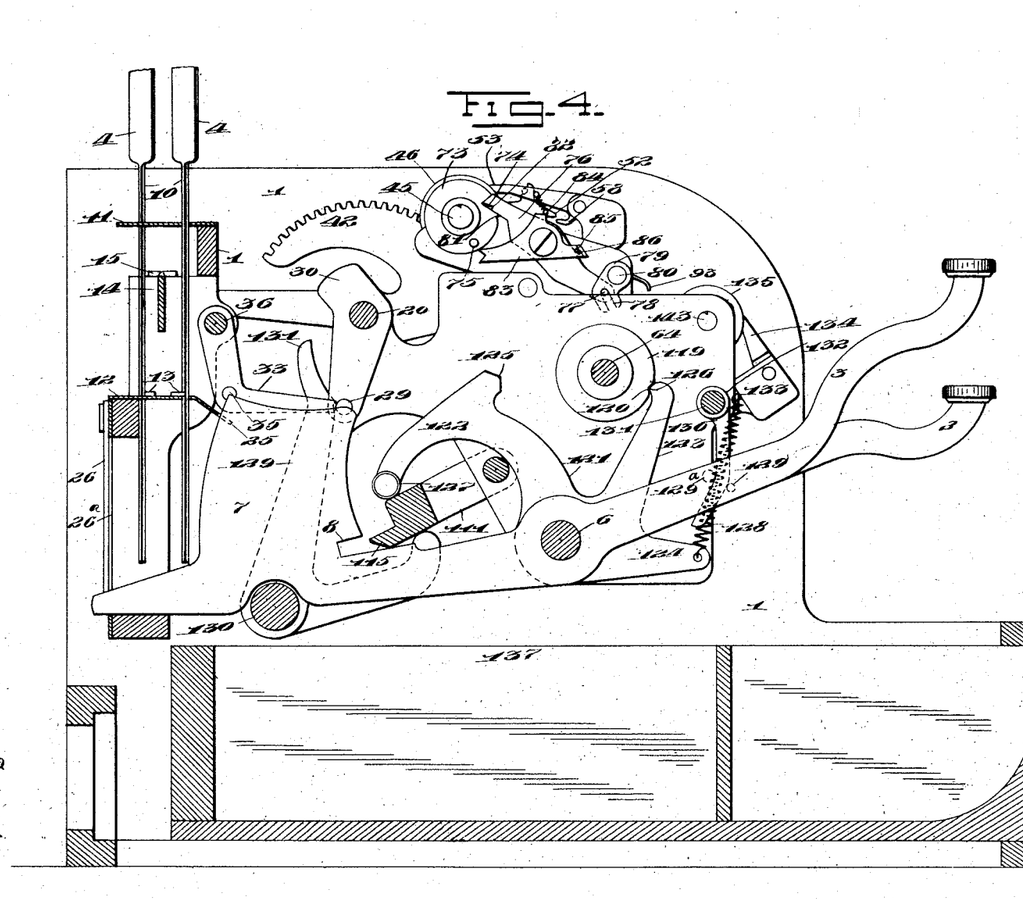
Fig. 4 represents a view similar to Fig. 3 but taken on the line $z$—$z$ of Fig. 5.

When it is desired to turn the counter-wheels to the zero position the shaft 45 is rotated to cause the walls of a groove 68 formed therein to engage spring pressed pawls 69 mounted on the respective counter-wheels and thus carry said wheels with the shaft until the zero position is reached (see Fig. 13). The rotation of the shaft 45 is effected by a beveled pinion 70 fast to one end of the same as shown in Fig. 6 and meshing with a similar pinion 71 fast to a short vertical shaft 72 mounted in the counter frame. This shaft is formed in its upper end with a suitable key notch for the insertion of a key for rotating the same. The opposite end of the shaft 45 carries a cam disk 73 having a notch 74 and a pin 75 as shown in Figs. 4 and 17. When the shaft is in normal position as shown in Fig. 4, one end of a pivoted lever 76 rests in the notch 74; the opposite end of said lever being provided with a pin 77 which projects into a slot 78 formed in a crank arm 79. This arm is fast to a rock shaft 80 mounted in the counter frame so that when said arm is moved the shaft will be simultaneously rocked. The movement of the arm is effected upon the initial movement of the cam 73 as such movement forces the end of the pawl 76 out of the notch 74. The cam 73 is further formed with a tooth 81 located in proximity to the notch 74 and adapted after the initial movement of the cam to prevent a return movement of the same by coöperating with a tooth 82 formed on the pawl 76, or with the end of the pawl itself. This construction prevents the counter-wheels being turned partly forward and the cam then turned backward to allow the pawl 76 to again become seated in the notch 74, and thus compels a full forward movement of the cam after its rotation has commenced.

In order to arrest the shaft 45 when the counter-wheels have reached zero position I provide a pivoted, notched pawl 83 formed with two stop lugs 84 and 85 (see Fig. 17) which coöperate with the edge of the pawl 76; a coiled spring 86 being interposed between said lug 85 and the pawl 76. It will be observed that when the parts are in the position shown in Fig. 4 that the notched end of the pawl 83 lies out of the path of the pin 75 and the cam 73 is thus free to move with the shaft 45. Upon the initial movement of the cam as above described the forward end of the pawl 76 is raised and thus elevates the lug 84 and raises the notched end of the pawl 83 into the path of the pin 75 to arrest the latter when the zero position is reached. When the pin reaches the pawl it enters the notched end of the same and thus prevents said pawl snapping down when the pawl 76 enters the notch 74 and moves down from under the lug 84. Just as soon however, as the pressure upon the shaft 45 is relaxed the spring 86 forces the pawl 83 out of engagement with the pin 75 and thus leaves the devices in position for the next turn to zero operation.

As before stated the operation of turning the counter to zero rocks the shaft 80 which action locks the machine against operation and prevents the tripping of any of the pawls 50. To effect the first mentioned result said shaft, as shown in Fig. 6 is provided with a slotted crank arm 87 into the slot of which projects a pin 88 mounted on a bell crank latch lever 89 pivoted on the counter-frame. This lever is formed at its lower end with a latching hook 90 which when the shaft 80 is rocked, enters a notch 91 formed in a disk 92 mounted on the shaft 64 and thus locks the shaft 64 against forward movement until the shaft 80 again returns to normal position as above described. To accomplish the second result the said shaft 80 is provided with a wing 93 the rear edge of which, when the shaft is in normal position, acts as a stop for all of the levers 54 as shown in Fig. 1. When the shaft 80 is rocked as above described the wing 93 is also rocked so that its rear edge is moved forward and up and its forward edge rearward and down. This forward edge contacts with the arm 61 and so rocks the levers 54 on their pivots that the transfer pawls 53 and consequently the pawls 50 are moved far enough forward for the latter to escape being struck by the transfer stud 49 on the counter-wheels. The shaft 80 is rocked back to normal position when the counter-wheels reach zero by a coiled spring 94 which connects a lug formed on said wing to the counter-frame; for which see Fig. 6.

The aforesaid shaft 64 also carries a cam 95 which is arranged to coöperate with a bevel-ended arm 96 formed on a yoke 97 which is journaled on the shaft 56 (Figs. 1 and 14). This yoke is adapted to coact with pins 98 mounted on the respective levers 54. The construction of the cam 95 is such that upon the initial movement of the same the arm 96 is forced rearward and thus rocks the yoke 97 and brings the same into contact with the pins 98. This action secures the return of any of the levers 54 which may have been previously operated and not properly returned to normal position by their respective springs. As the movement continues the arm 96 rides upon the periphery of the cam 95 and thus holds the levers 54 against any accidental movement during the time that motion is being imparted to the counter-wheels by the racks 41. Just as the counter-frame is moved back to disengage the counter-pinions from the racks 41, the reduced portion of the cam 95 is reached and the arm 96 is left free to be rocked forward; which operation releases all of the levers 54 and leaves them free to effect the transfers.

Figure 9:
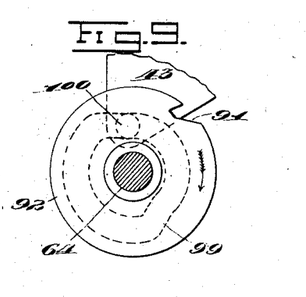
Fig. 9 represents an enlarged detail side elevation of a portion of the counter frame and the cam for rocking the same.

The movement of the counter-frame 43 to engage and disengage the counter-pinions from the registering segments or racks 41, is secured through the medium of the disk 92 which is formed with a cam groove 99 into which projects an anti-friction roller 100 mounted on a pendent portion of the counter-frame (Figs. 6 and 9). The formation of the cam groove 99 is such that the counter-frame is rocked forward when the registering segments are moving downward and is moved back again to normal position before the return movements of the racks have commenced.

Figure 15:
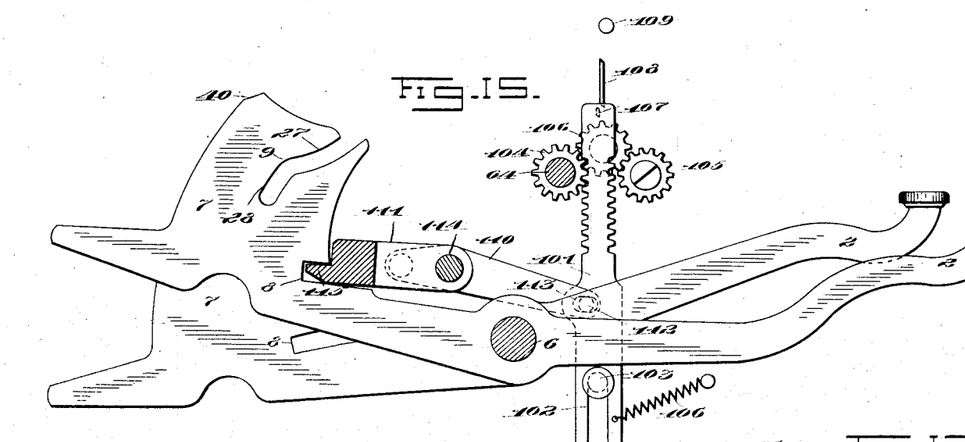
Fig. 15 represents a detail, side elevation of the rack-bar and pinions and coöperating parts shown in Fig. 3, said bar being in its lower position.

The said shaft 64 receives its rotary motion through the medium of a reciprocating rotation rack bar 101 having rack teeth formed on its opposite edges and a guiding slot 102 formed in its lower end as best shown in Figs. 3 and 15. A headed pin 103 mounted on the main frame projects through this slot and thus forms both a guide and a fulcrum for said rack. The upper end of the rack is shifted laterally to bring the respective sets of rack teeth alternately into engagement with pinions 104 and 105, by a coiled spring 106 connecting said rack bar to the frame. When the rack bar is in its upper normal position shown in Fig. 3, the spring 106 exerts its tension above the fulcrum pin 103 and the upper end of the rack is thus drawn forward into mesh with the pinion 105, but when the rack bar is moved to its lower position shown in Fig. 15 the tension of said spring is applied below the fulcrum 103 and the upper end of the rack bar is thus drawn into mesh with the pinion 104 which is fast upon the shaft 64. Motion is transferred from the pinion 105 to the pinion 104, so that the latter is continuously rotated in one direction by an intermediate idle pinion 106 journaled on the main frame; said pinions 104 and 105 being of sufficient width to mesh with the rack bar and this pinion 106 which operates beside said bar.

In order to hold the rotation rack-bar in mesh with the proper pinion during its full stroke in either direction I provide said bar with a lug 107 which is arranged to be guided by and to travel down one side and up the other of a rigid flange 108, formed on the main frame. A stud 109 is mounted on the main frame to limit the upward movement of the rack-bar and the pinions 104 and 105 limit its lateral movements.

The machine is provided with the usual key-coupler 111 which is pivoted upon the transverse shaft 114 and extends across all of the keys whereby it is reciprocated at each operation of a key. The rotation-rack is in turn reciprocated by the key-coupler through an arm 110 which is secured to the right hand end of the key-coupler and extends forwardly, its front end being provided with an anti-friction roller 112 which plays in a slot 113 formed in said rack.

Figure 8:
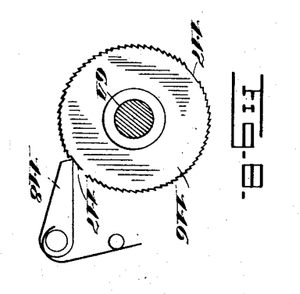
Fig. 8 represents a detail side elevation of the full stroke ratchet wheel and its pawl.

In order to compel a complete stroke of an operated key in both the directions of its movements, I provide a full-stroke device, as shown in Fig. 8, which comprises a ratchet-wheel 116 which is secured upon the rotation-shaft 64 and therefore makes one complete turn at each operation of the machine. At diametrically opposite points a few of the teeth are cut away, and a spring-pressed pawl 118 at all times engages the periphery of the ratchet-wheel as shown. When in normal position the pawl rests upon one of the cut away portions of the periphery of the ratchet-wheel. During the downward movement of the key the ratchet-wheel turns half-way around and when the key is at the bottom of its stroke the pawl again rests upon the opposite cut-away portion. During the return movement of the key the ratchet-wheel completes its revolution. The cut-away portions are provided in order to allow a slight lost-motion at the points where the direction of movement of the operated keys is reversed.

As the rapid rotary movement of the shaft 64 has a tendency to overthrow the same during the time the rack-bar is shifting from one pinion to the other, I provide means for positively arresting said shaft twice during each operation of a key, once when the key is at the lowest limit of its movement and again when said key returns to normal position. To this end as shown in Fig. 4 a disk 119 formed with a notch 120 is secured upon said shaft 64 and an alining lever 121 is journaled on the shaft 6. This alining lever is formed with three arms 122, 123 and 124; the two former being in turn formed with locking and alining noses 125 and 126. The arm 122 further carries an anti-friction roller 127 which is held down upon the top of the key-coupler by a coiled spring 128 which connects the arm 124 to the main frame. When the key-coupler is moved up upon the operation of a key the lever 121 is of course, rocked so as to disengage the nose 126 from the notch 120 and cause the nose 125 to enter the said notch as the disk 119 completes its half revolution and thus properly aline and arrest the shaft 64 at the end of the down stroke of the keys. When the coupler descends to normal position under the impulse of the spring 128 the nose 126 enters the notch 120 as shown in Fig. 4 and alines and arrests the shaft at the termination of the up strokes of the keys. It will be observed from the foregoing that the spring 128 serves the double purpose of operating the lever 121 and through said lever returning the key-coupler to normal position after it has been elevated.

Figure 16:
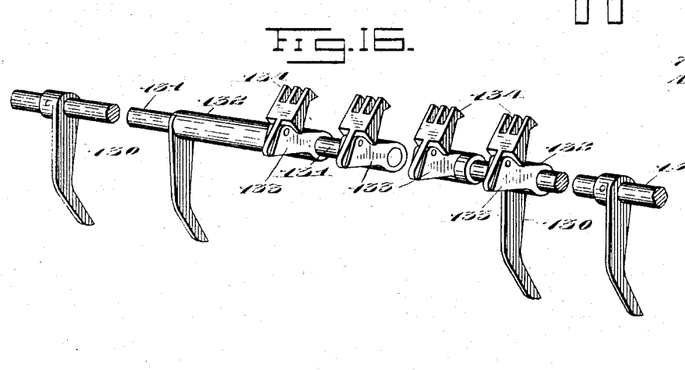
Fig. 16 represents a detail, perspective view of the shafts and sleeves carrying the pendent arms and operating pawls for the special counters.

The plates 7 of the special keys 3 as before stated and as shown in Figs. 4 and 11 are not provided with registering slots, but play between the respective registering frames 30 with which the remaining keys coöperate. The registering operations of said frames 30 is therefore not affected in any way by the operation of said special keys, but a separate record of the number of operations of the same is provided for as follows:

As shown in the drawings, the present embodiment of my invention comprises four special keys which are designated "No sale", "Rec'd on acc't", "Paid out" and "Charge" respectively. Each of said keys is provided with two spaced pins 129ª between which projects one of a series of four pendent cam-arms 130 (Figs. 1 and 16). These cam-arms are supported by two transverse shafts 131 which extend in line with each other. Upon the left-hand one of said shafts, the cam arm 130 which coöperates with the "No sale" key, is rigidly secured, and upon the right-hand end of said shaft is also rigidly secured the pawl-carrying arm 133 which carries a usual form of actuating pawl 134. Midway upon said shaft is a sleeve 132, rigidly secured upon the left-hand end of which is the cam arm 130 which coöperates with the "Rec'd on acc't" special key, and carried by the right-hand end of which is also a pawl-carrying arm 133 and an actuating pawl 134. The right-hand transverse shaft 131 is similarly equipped with cam-arms, sleeve, and actuating pawls. The actuating pawls 134 respectively coöperate with the ratchet-wheels 170 of the four sets of special counter-wheels 135, whereby it will be readily understood that when a special key is operated its respective special counter is turned one notch by the actuating pawl 134. At the close of the day's business the proprietor or other person in authority, by reference to the special counters can at a glance determine the number of times each special key has been operated. All of the counter-wheels of the special counters are mounted upon a common shaft 143 and are arranged to be "picked up" and returned to zero by the same in the same manner as the counter-wheels of the totalizing counter. The end of the shaft 143 is provided with a beveled pinion 144 which meshes with a similar pinion 145 journaled on the main frame and formed with a key aperture for the reception of a suitable operating key (see Fig. 5). The special counter-wheels are prevented from moving backward by a series of spring pressed retaining pawls 136 mounted on the main frame and engaging the ratchet-wheels 170 as shown in Fig. 1.

The cash drawer 137 which is mounted in any suitable manner so as to slide in the lower portion of the frame is arranged, when released to be forced outward by a coiled spring 138 mounted in the cabinet behind it (as shown in Fig. 1). It is normally held in its inner closed position by a pivoted latching lever 139 journaled on the shaft 6 and projecting rearward so as to engage a pivoted spring-pressed dog 140 mounted on said cash drawer. When the drawer is being closed the dog is depressed against the tension of its spring by the end of the lever 139 under which it passes and snaps up back of the same when the drawer is fully closed. The said lever 139 is elevated to release the drawer by a hooked arm 141 formed thereon and projecting up through the key-coupling bar or frame so that when the latter is elevated upon the operation of the keys, the hooked end will be engaged and the lever raised. In order to assure the return of the lever 139 to its normal locking position when the key-coupler returns downward, said coupler is provided with a short arm 142, which is arranged to contact with the forward edge of the arm 141 and rock it rearward upon the final downward movement of the coupler.

By reference to Fig. 2 it will be seen that I have provided a bell 143 and arranged to sound the same upon each operation of the machine through the medium of the rotation shaft 64. This shaft carries a cam 144 which coöperates with a nose 145 formed on a pivoted bell clapper lever 146 which is arranged to be normally drawn toward the bell by a coiled spring 147 which connects it to the main frame. The lower end of the bell clapper lever is engaged by a pin 148 mounted on a suitable lock-disk 149 controlled from the exterior of the machine by a suitable key. By rotating this lock-disk the clapper lever may be moved so far back by the said pin 148 that it cannot engage and sound the bell when it is actuated by its cam.

The left-hand end of the key-coupler, as shown in dotted lines in said Fig. 2, and in Fig. 5, is provided with a pin 150 which is arranged to be engaged by a hook-arm 151 formed on a slide 152 to prevent the operation of the machine by preventing the coupler from rising. This slide is supported in position by the shaft 130 and a pin 153 both of which project through elongated slots 154 formed in said slide. A coiled spring 171 connects said slide to the main frame so as to normally draw the hook 151 over the pin 150 when the slide is free. The rear end of the slide is provided with a pendent hooked arm 155 which projects into the path of the cash drawer so that when the latter is closed the slide is in the position shown in Fig. 2 in which the hooked arm 151 lies out of the path of the pin 150. When the drawer is opened the slide is allowed to pass forward under the impulse of its spring so as to bring its hooked arm in the path of the pin 150 and thus lock the machine against operation as long as the drawer remains open. This structure effectually prevents the operation of any of the keys while the cash drawer is open and thus compels the closing of said drawer after each registration. At times however, it is desirable to so adjust the parts that the keys may be operated with the cash drawer open and to effect this result I provide a pivoted lever 156 which when operated contacts with a pin 157 mounted on the arm 151 and thus forces the slide 152 back so that said hooked arm is moved out of the path of the pin 150. The said lever 156 is located within the case which is provided for the machine so that it can be set or operated only by the person having access to the interior of said case.

To the extent of having registering frames and segments carried thereby, a series of counter or registering wheels carried in a rocking frame and a rotation-shaft which is arranged to bring the counter-wheels into engagement with the registering segments and to operate the transfer devices, my present invention resembles the patent granted to me May 23, 1893 and numbered 497,860. But the machines differ in other and very important respects. For instance, in my present invention each key or a rigid part thereof, is provided with a registering slot which is compound in its nature, as it comprises the cam portion 27 and the free-play or locking portion 28. It will be observed that under this construction the registering movement of the counter wheels begins as soon as a key is started and said registering movement is entirely completed before the initial movement of said key is finished. That is, the registering is accomplished while the bar 29 of the registering frame is passing through the cam portion of the slot, and from then until said bar travels to the end of the free-play portion and returns to the inner end of the cam portion of the slot, the registering segment is simply held immovable. There is, therefore, at all times a positive engagement between the key and the registering segment which prevents the latter being thrown ahead of the operated key. Under the construction shown in my said patent the registering movement is completed practically simultaneous with the completion of the downward movement of the operated key which has the disadvantage that when the key is thrown down with considerable force or violence and strikes suddenly against its stop at the bottom of its stroke, there is a strong tendency for the registering segments to overthrow, as will be readily understood, and in practice several cumbersome and otherwise unnecessary devices have been resorted to, to overcome this difficulty. With my present construction on the other hand, as stated, the register operation is completed before the end of the initial or downward movement of the actuating key and as the registering segments are in locked condition before and when the keys reach the end of their downward or initial movement, there is no chance for the segments to overthrow regardless of the violence with which the keys may be operated. My present construction, also, is much better adapted to have a printing device attached to it than the machine shown in my said patent, because, in the first place there would be, so far as the registering segments are concerned, no possibility of overthrowing the printing-wheels. Moreover, the printing-wheels would be in adjusted position before the operated key reached the bottom of its stroke and there is therefore plenty of time in which to aline the printing-wheels, which was not true to the desired extent, of machines constructed according to my said patent.

Having thus described my invention what I claim as new and desire to secure by Letters Patent is:

1. In a cash register, the combination with a counter, of a series of operating keys each of which is provided with a rigid plate having a slot formed with a portion concentric to the key fulcrum and a portion eccentric thereto, and a registering frame coöperating with both walls of said slots.

2. In a cash register, the combination with a series of registering wheels, registering segments arranged to actuate the registering wheels, and a series of pivotally operated keys having registering slots means connected to said segments and adapted to engage both walls of the registering slots to first move the registering segments so as to actuate the registering wheels and to then lock said segments in such moved position during the remainder of the initial movement of said keys and also during a portion of the return movement.

3. In a cash register, the combination with a series of totalizing registering wheels, of a series of amount or value keys each of which has a registering slot comprising a cam or operating portion and a portion concentric with the axis of said keys, and connecting mechanism adapted to engage both walls of the slots and arranged to turn the registering wheels.

4. In a cash register, the combination with a series of registering wheels, registering segments arranged to actuate the registering wheels, and a series of pivotally operated keys having an initial and a return movement and formed respectively with registering slots and connecting devices adapted to engage both walls of said slots to transmit the full registering movement of the segments and to then lock the latter before the completion of the final initial movement of said keys.

5. In a cash register, the combination with a series of normally disengaged counter or registering wheels, of a series of keys in a rigid part of each of which is formed an operating cam slot, a registering frame intermediate the counter and said keys and to which the keys become coupled, and means for bringing the registering wheels into engagement with the registering frame when said keys are operated.

6. In a cash register, the combination with a series of pivotally operated keys having an initial and a return movement and each having a registering slot, of a series of totalizing registering wheels, and devices intermediate the wheels and adapted to engage both walls of the registering slots of the keys to give the wheels their full registering movement before the completion of the initial movement of the keys and then become locked while the keys continue their movements.

7. In a cash register, the combination with a series of key levers having an initial and a return movement and each having a registering slot, formed with a cam portion and a concentric portion, of a series of totalizing registering wheels, and devices intermediate the wheels and the registering slots of the keys and adapted to engage both walls to give the said wheels their full registering movement during the engagement of the cam portions of the slots and then become locked during the engagement of the concentric portions.

8. In a cash register, the combination with the registering segments and connections, of the normally disengaged registering wheels, the series of amount or value keys having registering slots both walls of which are adapted to engage and give the registering segment connections their full registering movements before the completion of the initial movements of said keys, and means actuated by the keys for bringing the registering wheels into engagement with the segments before the registering movements of the latter.

9. In a cash register, the combination with a series of counter-wheels, of a series of keys, a pivoted registering frame operated by said keys, a member common to all of the keys and actuated by any one of the same, and a pivoted lever operated by the common member and having a cam end for giving an additional movement to the registering frame after it has been operated by the keys.

10. In a cash register, the combination with a series of counter wheels, of a series of keys, a series of indicators coöperating with said keys and arranged in two parallel rows, a slidable bar arranged between said rows of indicators, and having projections on both sides for supporting said indicators and means connecting said bar to the movable parts of the machine for actuating the same.

11. In a cash register, the combination with a series of counter-wheels, of a series of keys, a series of indicator tablets arranged in parallel rows, and having supporting projections, a slidable bar arranged between said rows of indicators and having spaced fingers projecting forwardly and rearwardly therefrom to coact with the supporting projections of the indicators, and means for moving said bar.

12. In a cash register, the combination with the operating devices, of a shiftable rack-bar arranged to be reciprocated by the same, a rotary shaft, spaced pinions arranged to be engaged by said rack to impart movement to said shaft, and means for holding and alining the rotary shaft during the time the rack-bar is being shifted.

13. In a cash register, the combination with the reciprocating operating devices, a rack-bar actuated by said devices and mounted to rock on a fulcrum, a spring for rocking said bar on its fulcrum by exerting its tension at opposite sides of said fulcrum as the bar is operated, a rotary shaft, and gearing arranged to be engaged by the rack for imparting a continuous rotary movement to the shaft.

14. In a cash register, the combination with a series of counter-wheels, of a series of keys, a pivoted registering frame having a bar arranged to coöperate with the keys whereby the frame is rocked according to the value of the key operated, a member common to all of the keys and a lever operated by the common member to engage said bar and thereby return the frame to normal position.

15. In a cash register, the combination with a series of counter-wheels, of a series of keys, a member common to all of said keys, a rotary shaft, a shiftable rack-bar connected to the common member spaced gears coöperating with the rack bar and arranged to operate the rotary shaft and means for alining the rotary shaft during the time the rack-bar is being shifted.

16. In a cash register, the combination with a series of counter-wheels, of a series of operating keys, each of which is provided with a plate forming a rigid part thereof and having a registering slot, a registering frame arranged to coöperate with the registering slots, a lock for said registering frame and means controlled by said plates for operating said lock.

17. In a cash register, the combination with a series of keys, of a rack bar, means connecting the rack bar to the keys, spaced pinions having teeth of greater width than the teeth of the rack bar and arranged to alternately coöperate with the bar, a gear permanently connecting the pinions, located beside the bar, and means for shifting the bar to cause it to alternately engage the pinions.

18. In a cash register, the combination of a series of keys, a member common to all of said keys, a shifting rack bar arranged to be actuated by said member, a rotary shaft, spaced pinions arranged to be alternately engaged by said rack bar to impart a rotary movement to said shaft, an alining disk mounted on said shaft and alining means operated by said common member and coöperating with said disk.

19. In a cash register, the combination of a series of keys, a member common to all of said keys, a rack bar reciprocated by said keys, a spring for moving said bar laterally as it is reciprocated, pinions arranged to be alternately engaged by said bar as it moves in opposite directions, an intermediate pinion connecting said pinions, a shaft rotated by said pinions, and alining and locking means for said shaft adapted to be operated by said common member.

20. In a cash register, the combination of a series of keys, a member common to all of said keys, a slidable rack bar, a guide for said bar arranged to also form a fulcrum for the same, a spring connected to said bar so that when the latter is reciprocated its tension will alternately be exerted upon opposite sides of the fulcrum to rock the bar laterally, pinions adapted to be alternately engaged by said bar when so rocked and an operating shaft connected to said pinions.

21. In a cash register, the combination of a series of keys, a member common to said keys, a rotary shaft operated by said member, a notched alining disk mounted on said shaft, a pivoted lever having two alining arms coöperating with said disk, and an anti-friction roller mounted on one of said arms and engaging the common member whereby the lever is operated.

22. In a cash register, the combination with a counter, of a series of keys each of which is formed with a registering slot comprising a cam portion eccentric to its fulcrum and a portion concentric to its fulcrum, a registering frame having a cross bar which is arranged to be engaged by both of the walls of the registering slots to move the said frame and then lock it against movement.

23. In a cash register, the combination with a counter, of a series of keys, a movable registering frame arranged to coöperate with the keys whereby the frame is actuated according to the value of the key operated, a member common to all of the keys, and a lever operated by the common member and arranged to engage the movable registering frame to return the same to its normal position.

24. In a cash register, the combination with the operating devices, of a rack bar actuated by the same and mounted to rock upon a fulcrum, a spring for rocking said bar on its fulcrum as the bar is actuated to bring the stress of said spring to the opposite sides of the fulcrum, a rotary member, and means intermediate the rack bar and said member for operating the latter.

25. In a cash register, the combination with a counting mechanism, of a series of operating keys, each of which is provided with a plate forming a rigid part thereof and having a registering slot, a registering member arranged to coöperate with the slots of the respective keys, and a lock for the registering member controlled by the aforesaid plates.

26. In a cash register, the combination with a counter, of a series of keys, a movable registering frame coöperating with the keys and arranged to be operated according to the value of the key actuated, a member common to all of the keys, and a cam device operated by the common member and engaging the frame to return it to its normal position.

27. In a cash register, the combination with a counter, a series of operating devices therefor, and a series of keys controlling said operating devices; of transfer elements for said counter comprising transfer projections on the counter wheels, tripping pawls, transfer pawls, means for operating the latter, and projections carried by the tripping pawls and the transfer pawls respectively, said projections coöperating to positively cause the engagement of a transfer pawl with its counter wheel when the pawl is operated.

28. In a cash register, the combination with a counter, operating devices therefor, and a series of keys controlling said operating devices; of transfer pawls for said counter; means for operating said pawls; and means also operated by said transfer pawl operating means for positively moving the transfer pawls out of contact with their respective counter wheels prior to the main operation of the transfer pawls.

29. In a cash register, the combination with a counter, operating devices therefor, and a series of keys controlling said operating devices; of transfer pawls for said counter; a transfer pawl operating shaft; restoring projections formed on said transfer pawls; a returning bar for engaging said projections; and a cam operated by said transfer pawl operating shaft, said cam operating upon said returning bar to restore the transfer pawls to normal position.

30. In a cash register, the combination with a series of keys, of a rotation shaft, a member common to said keys, a rack operated by said member, pinions meshing successively with said rack as it moves in opposite directions and connections from said pinions to said rotation shaft and means for shifting said rack to mesh successively with said pinions.

31. In a cash register, the combination with a series of keys and a member operated by any of said keys, of a cash receptacle, means for latching same arranged to be released by said key operated member, and means operated by said member for positively returning said latching means to normal position.

32. In a cash register, the combination with a series of keys of a shaft given a rotation at each operation of said keys and having a locking disk, a register, means for resetting same to normal, and a pawl moved by said resetting means to engage said locking disk and thereby prevent operation of the keys.

33. In a cash register, the combination with a register, of a series of keys, and means for operating said register from the keys, of a member common to the keys and operated thereby, and a lever having one arm engaging under the common member and another arm positioned to give the register operating means its final return movement by the final movement of the common member.

34. In a cash register, the combination with a series of keys, of a series of indicators elevated by said keys and arranged in two parallel rows, a bar between said rows of indicators having projections on both sides for supporting said indicators, and means for actuating said bar to release and support elevated indicators.

35. In a cash register, the combination with a series of manipulative elements, of indicators controlled thereby and arranged in two parallel rows, a bar between said rows of indicators and formed to support both said rows, and means for actuating said bar to release the indicators.

36. In a cash register, the combination with a series of keys, of a common member operated thereby, a rack bar carried by said member having two racks on opposite sides thereof, a gear meshing with one of said racks as the rack bar moves in one direction and a second gear meshing with the other rack as the rack bar moves in another direction.

37. In a cash register, the combination with a register, of a series of keys, and register actuating means differentially movable by said keys, a member common to said keys and a bell crank lever pivoted so that one arm engages under said common member, the other arm being positioned to engage the register actuating means and positively return said means to normal position.

In testimony whereof I affix my signature, in the presence of two witnesses.

THOMAS CARNEY.

Witnesses:
IRA BERKSTRESSER,
ALVAN MACAULEY.